(12) United States Patent
Park et al.

(10) Patent No.: US 9,432,921 B2
(45) Date of Patent: Aug. 30, 2016

(54) METHOD AND DEVICE FOR PERFORMING ACTIVE SCANNING

(71) Applicant: LG ELECTRONICS INC., Seoul (KR)

(72) Inventors: Giwon Park, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/759,156

(22) PCT Filed: Jan. 10, 2014

(86) PCT No.: PCT/KR2014/000301
§ 371 (c)(1),
(2) Date: Jul. 2, 2015

(87) PCT Pub. No.: WO2014/109591
PCT Pub. Date: Jul. 17, 2014

(65) Prior Publication Data
US 2015/0358897 A1    Dec. 10, 2015

Related U.S. Application Data

(60) Provisional application No. 61/751,259, filed on Jan. 11, 2013, provisional application No. 61/756,427, filed on Jan. 24, 2013, provisional application No. 61/758,282, filed on Jan. 30, 2013, provisional
(Continued)

(51) Int. Cl.
*H04W 4/00* (2009.01)
*H04W 48/16* (2009.01)
(Continued)

(52) U.S. Cl.
CPC ............. *H04W 48/16* (2013.01); *H04W 84/12* (2013.01)

(58) Field of Classification Search
CPC ............................ H04W 48/16; H04W 84/12
See application file for complete search history.

(56) References Cited

U.S. PATENT DOCUMENTS

| 2004/0103278 A1 | 5/2004 | Abhishek et al. |
| 2006/0025128 A1* | 2/2006 | Lee .................. H04W 36/0083 455/432.1 |

(Continued)

FOREIGN PATENT DOCUMENTS

| KR | 10-2012-0079115 | 7/2012 |
| KR | 10-2012-0125360 | 11/2012 |
| KR | 10-2012-0126094 | 11/2012 |

OTHER PUBLICATIONS

PCT International Application No. PCT/KR2014/000301, Written Opinion of the International Searching Authority dated Apr. 15, 2014, 1 page.

*Primary Examiner* — Erin File
(74) *Attorney, Agent, or Firm* — Lee, Hong, Degerman, Kang & Waimey; Jonathan Kang; Michael Monaco

(57) ABSTRACT

A method and a device for performing active scanning are disclosed. The method for active scanning of a STA comprises the steps of: transmitting a probe request frame that contains channel monitoring type information in a scanning channel; determining whether the scanning channel is in a busy state until a MinimumChannelTime; determining whether a PPDU including a valid PLCP header is received in the scanning channel until the MinimumChannelTime; and determining a time for monitoring a probe response frame transmitted by the AP in the scanning channel based on whether the PPDU is received until the MinimumChannelTime and channel monitoring type information, when the scanning channel is in the busy state, wherein the channel monitoring type information can contain information on a type with which the STA monitors the probe response frame in the scanning channel.

12 Claims, 16 Drawing Sheets

Related U.S. Application Data application No. 61/814,822, filed on Apr. 23, 2013, provisional application No. 61/819,660, filed on May 6, 2013, provisional application No. 61/821,210, filed on May 8, 2013.

(51) Int. Cl.
*H04M 11/00* (2006.01)
*H04W 84/12* (2009.01)

(56) References Cited

U.S. PATENT DOCUMENTS

2013/0230035 A1\* 9/2013 Grandhi ................ H04W 48/16
  370/338
2013/0329658 A1\* 12/2013 Liu ....................... H04W 74/02
  370/329

\* cited by examiner

FIG. 1
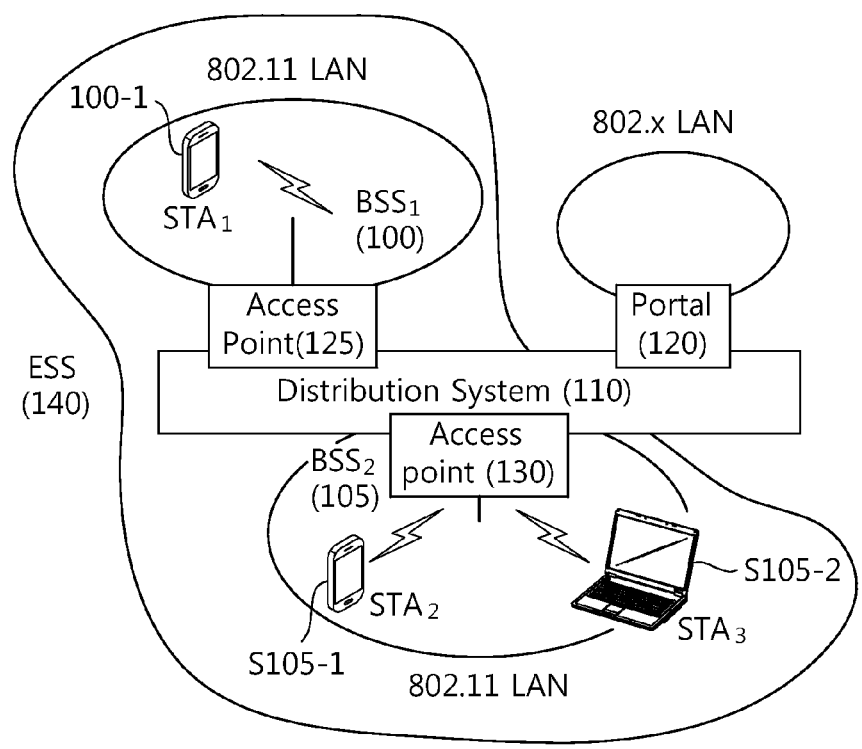
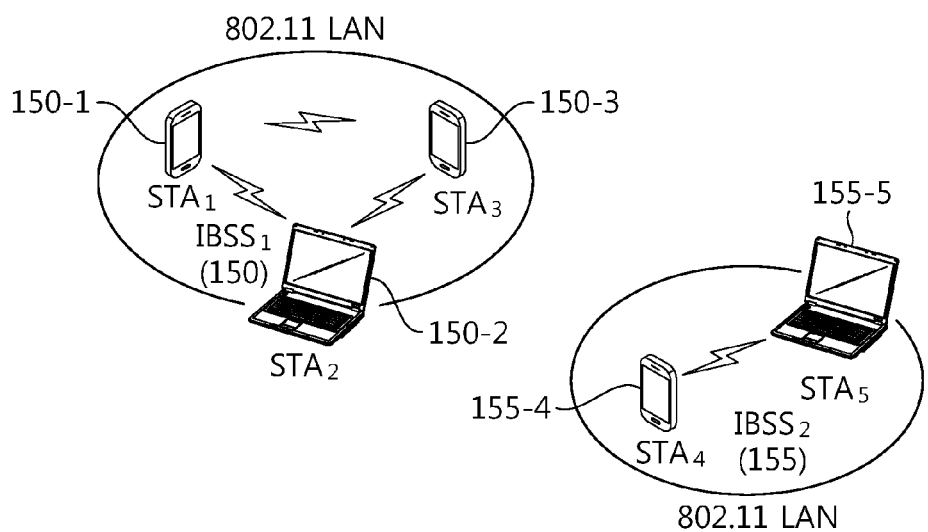

FIG. 6
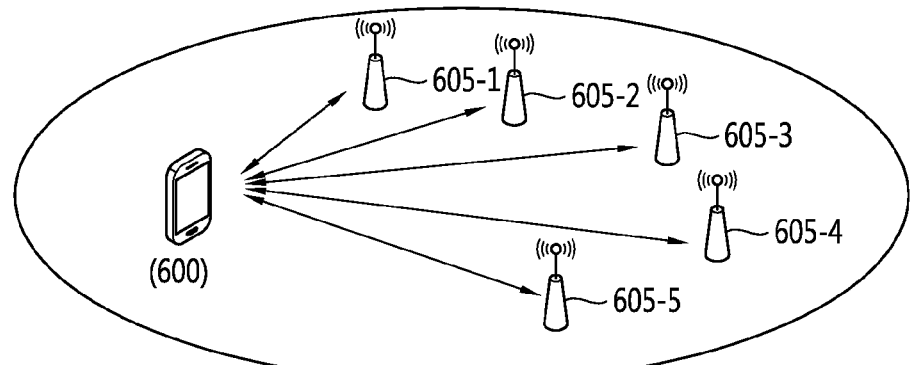
probe request frame (610)
(wildcard, SSID, wildcard BSSID)
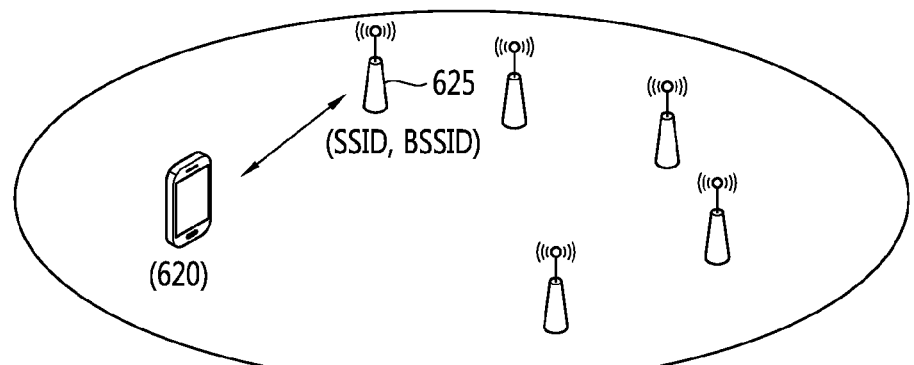
probe request frame (630)
(SSID, BSSID)
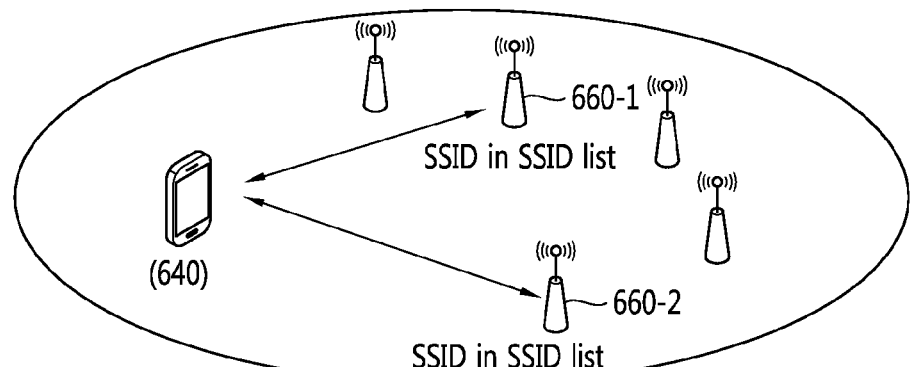
probe request frame (660)
(SSID, wildcard BSSID)

METHOD AND DEVICE FOR PERFORMING ACTIVE SCANNING

CROSS-REFERENCE TO RELATED APPLICATIONS

This application is the National Stage filing under 35 U.S.C. 371 of International Application No. PCT/KR2014/000301, filed on Jan. 10, 2014, which claims the benefit of U.S. Provisional Application Nos. 61/751,259, filed on Jan. 11, 2013, 61/756,427, filed on Jan. 24, 2013, 61/758,282, filed on Jan. 30, 2013, 61/814,822, filed on Apr. 23, 2013, 61/819,660, filed on May 6, 2013 and 61/821,210, filed on May 8, 2013, the contents of which are all hereby incorporated by reference herein in their entirety.

BACKGROUND OF THE INVENTION

1. Field of the Invention

The present invention relates to a wireless local area network (LAN) and, more particularly, to a method and a device for performing active scanning.

2. Related Art

In recent years, a wireless LAN technology has been chiefly evolved to three directions. There are institute of electrical and electronic engineers (IEEE) 802.11ac and IEEE 802.11ad as efforts for further increasing a transmission rate as an extension of an evolving direction of a wireless LAN according to the related art. The IEEE 802.11ad is a wireless LAN technology using a 60 GHz band. In addition, in order to enable wide band transmission in a distance side as compared with a wireless LAN according to the related art, a wide band wireless LAN using a frequency band less than 1 GHz has been recently spotlighted. Accordingly, there are an IEEE 802.11af using a TV white space (TVWS) and an IEEE 802.11ah using a 900 MHz band. The IEEE 802.11af and the IEEE 802.11ah is mainly aimed at extending in a Wi-Fi (extended range Wi-Fi) service as well as a smart grid and a wide band sensor network. Further, an existing wireless LAN medium access control (MAC) has a problem that an initial link setup time is long in some cases. When the station (STA) performs rapid access to an AP, IEEE 802.11ai standardization activity has been actively achieved.

The IEEE 802.11ai is a MAC technology to achieve a rapid authentication process in order to significantly reduce initial set-up and an association time of the wireless LAN and starts standardization activity as a normal task group in Jan. 2011. In order to enable a rapid access process, the IEEE 802.11ai has discussed about simplification of a process in AP discovery, network discovery, time synchronization function (TSF) synchronization, authentication & association, and a procedure combination with a higher layer. Among them, ideas such as procedure combination using a piggyback of a dynamic host configuration protocol (DHCP), optimization of full extensible authentication protocol (EAP) using a concurrent IP, and an efficient selective access point (AP) scanning are discussed.

SUMMARY OF THE INVENTION

The present invention provides a method for performing active scanning of a STA.

The present invention further provides an STA for performing active scanning.

A method for active scanning of a station (STA) according to an aspect of the present invention to achieve the above object includes: transmitting, by the STA, to an access point (AP), a probe request frame including channel monitoring type information in a scanning channel; determining, by the STA, whether the scanning channel is in a busy state until a MinimumChannelTime; determining, by the STA, whether a physical layer convergence procedure protocol data unit (PPDU) including a valid physical layer convergence procedure (PLCP) header is received in the scanning channel until the MinimumChannelTime; and determining a time for monitoring a probe response frame transmitted by the AP in the scanning channel based on whether the PPDU is received until the MinimumChannelTime and the channel monitoring type information, when the scanning channel is in the busy state, wherein the channel monitoring type information includes information related to a type of the STA to monitor the probe response frame in the scanning channel. The time for monitoring the probe response frame is determined as the MinimumChannelTime when the PPDU is not received in the scanning channel until the MinimumChannelTime and the channel monitoring type information indicates a first type, and the time for monitoring the probe response frame may be determined as a MaxChannelTime when the PPDU is not received in the scanning channel until the MinimumChannelTime and the channel monitoring type information indicates a second type. The method may further include monitoring, by the STA, the scanning channel during the maximum channel time when the STA receives the PPDU in the scanning channel until the MinimumChannelTime. The probe request frame may further include information related to whether the STA is an STA for performing rapid link configuration, and wherein the time for monitoring the probe response frame may be determined when the STA is a STA for performing rapid link configuration. The AP may determine whether to retransmit the probe response frame based on the channel monitoring type information A STA for active scanning according to another aspect of the present invention to achieve the above object includes: A station (STA) for performing active scanning, the STA including: a radio frequency (RF) unit configured to transmits and receive radio signals; and a processor operatively coupled to the RF unit and configured to: transmit to an access point (AP), a probe request frame including channel monitoring type information in a scanning channel; determine whether the scanning channel is in a busy state until MinimumChannelTime, determine whether a PPDU including a valid physical layer convergence procedure (PLCP) header is received in the scanning channel until the MinimumChannelTime, and determine a time for monitoring a probe response frame transmitted by the AP in the scanning channel based on whether the PPDU is received until the MinimumChannelTime and the channel monitoring type information, when the scanning channel is in the busy state, wherein the channel monitoring type information includes information related to a type of the STA to monitor the probe response frame in the scanning channel. The time for monitoring the probe response frame may be determined as the MinimumChannelTime when the PPDU is not received in the scanning channel until the MinimumChannelTime and the channel monitoring type information indicates a first type, and the time for monitoring the probe response frame may be determined as a MaxChannelTime when the PPDU is not received in the scanning channel until the MinimumChannelTime and the channel monitoring type information indicates a second type. The processor may be configured to monitor the scanning channel during the maximum channel time when the PPDU is received in the scanning channel until the MinimumChannelTime. The probe request frame further includes information related to whether the STA is an STA for performing rapid link configuration, and the time for monitoring the probe response frame may be determined when the STA is an STA for performing rapid link configuration. The AP may determine whether to retransmit the probe response frame based on the channel monitoring type information. The processor may be configured to determine the channel monitoring type information based on available scanning delay, and the available scanning delay may be an available time in order to receive the probe response frame in the scanning channel by the STA.

The STA may determine a time for monitoring a scanning channel for active channel by determining whether the AP is located in a channel. By using the above method, when the AP is not located in a scanning channel, the STA may rapidly search the AP by reducing a time for scanning the scanning channel.

BRIEF DESCRIPTION OF THE DRAWINGS

FIG. 1 is a concept diagram illustrating a configuration of a wireless local area network (WLAN).

FIG. 6 is a concept diagram illustrating a method for transmitting a probe request frame.

DESCRIPTION OF EXEMPLARY EMBODIMENTS

FIG. 1 is a concept view illustrating the structure of a wireless local area network (WLAN).

An upper part of FIG. 1(A) shows the structure of the IEEE (institute of electrical and electronic engineers) 802.11 infrastructure network.

Referring to the upper part of FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
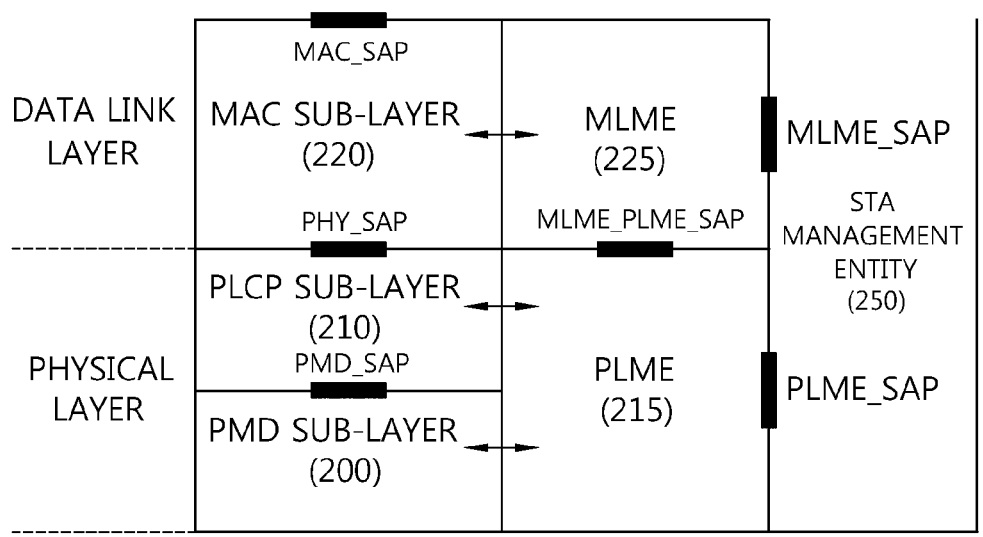
FIG. 2 is a diagram illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
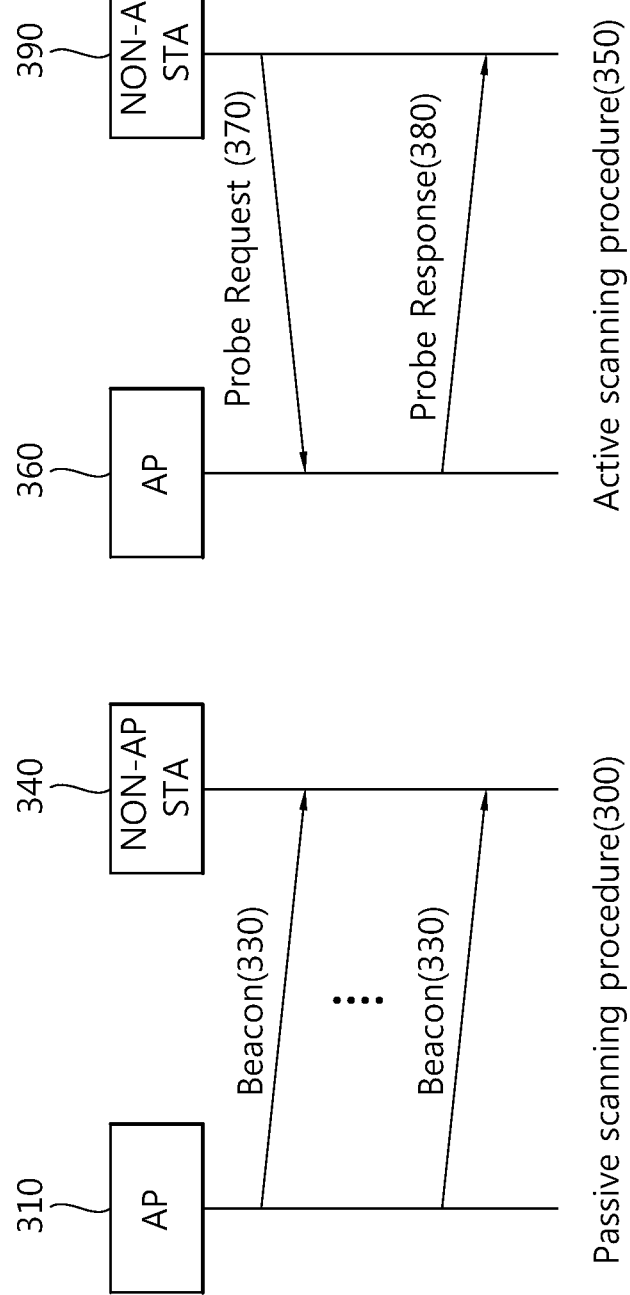
FIG. 3 is a concept diagram illustrating a scanning method in the WLAN.

FIG. 3 is a concept view illustrating a scanning method in a WLAN.

Referring to FIG. 3, the scanning method may be divided into passive scanning 300 and active scanning 350.

Referring to a left part of FIG. 3, the passive scanning 300 may be performed by a beacon frame 330 that is periodically broadcast from the AP 310. The AP 310 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Referring to a right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
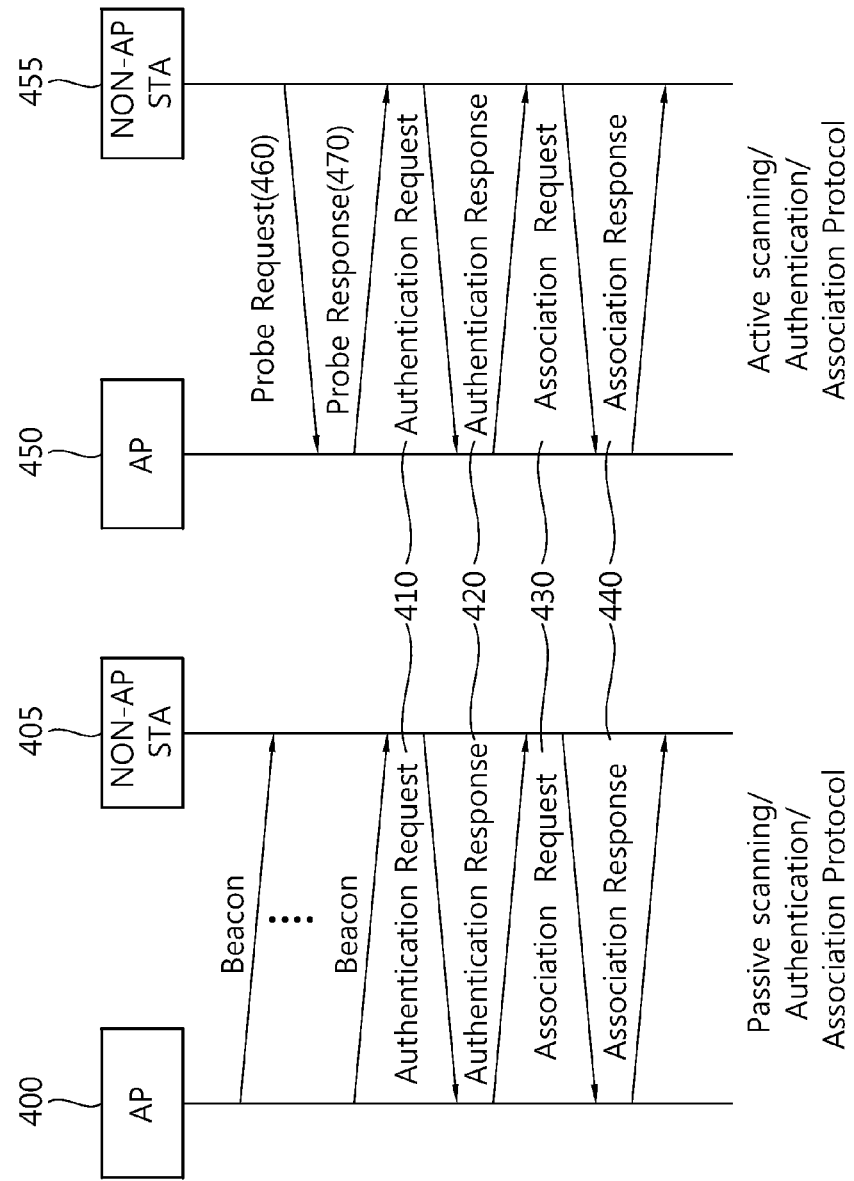
FIG. 4 is a concept diagram illustrating an authentication and association procedure after scanning of an AP and a STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. A left part of FIG. 4 is a concept view illustrating an authentication and association process after passive scanning, and a right part of FIG. 4 is a concept view illustrating an authentication and association after active scanning.

The authentication and association process may be equally performed by exchanging an authentication request frame 410/authentication response frame 420 and an association request frame 430/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 400 or 450 to the non-AP STA 405 or 455. The transmitted association request frame 430 contains information on the capability of the non-AP STA 405 or 455. Based on the information on the capability of the non-AP STA 405 or 455, the AP 400 or 450 may determine whether the non-AP STA 405 or 455 may be supported. In case such support is possible, the AP 400 or 450 may include in the association response frame 440 whether to accept the association request frame 430 and a reason therefore, and its supportable capability information, and the AP 400 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
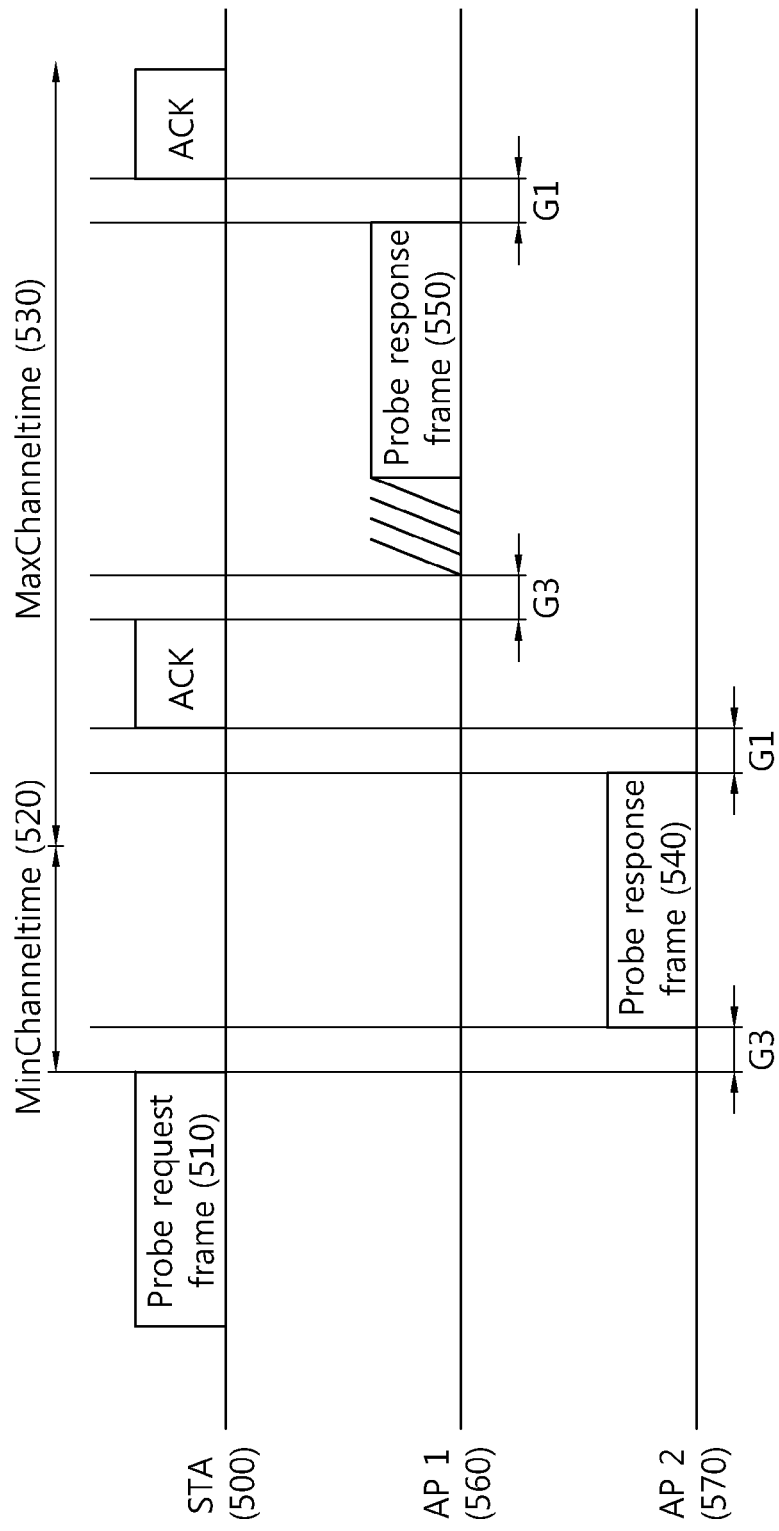
FIG. 5 is a concept diagram illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 540 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 540 and 550 to the STA 500.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 540 and 550 until the minimum channel time 520, the STA 500 shifts scanning channels to perform scanning on other channel. In case the STA 500 receives the probe response frame 550 until the minimum channel time 520, it may process the received probe response frames 540 and 550 after waiting until the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 540 and 550 received by the STA 500 when PHY-CCA.indication is detected to be busy and may determine that there are no probe response frames 540 and 550 received by the STA 500 when PHY-CCA.indication is detected to be idle.

In case PHY-CCA.indication is detected to be idle, the STA 500 may set an NAV (net allocation vector) to 0 and the STA 500 may scan a next channel. In case PHY-CCA.indication is detected to be busy, the STA 500 may perform a process on the received probe response frames 540 and 550 after the probe timer reaches the maximum channel time 530. After the process on the received probe response frames 540 and 550 is done, the STA 500 may set the NAV (net allocation vector) to 0 and may then scan a next channel.

Hereinafter, in embodiments of the present invention, determining whether there are probe response frames 540 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on Nov., 2011.

The following Table 1 briefly represents example information included in MLME-SCAN.request primitive.

TABLE 1

| name | description |
| --- | --- |
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingSeviceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors | may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

FIG. 6 is a concept view illustrating a probe request frame transmission method.

FIG. 6 discloses methods of broadcasting, multicasting, and unicasting probe request frames from an STA.

An upper part of FIG. 6 shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 605-1, 605-2, 605-3, 605-4, and 605-6 included in the transmission range of the STA 600.

In case the STA 600 transmits the probe request frame 610 with the wildcard SSID and the wildcard BSSID included in the probe request frame 610, the APs 605-1, 605-2, 605-3, 605-4, and 605-6 that have received the probe request frame 610 from the STA 600 may send probe response frames to the STA 600 in response to the received probe request frame.

In case the APs 605-1, 605-2, 605-3, 605-4, and 605-6 that have received the broadcast probe request frame 610 send the probe response frames to the STA 600 in response to the received probe request frame 610 within a predetermined time, the problem may occur that the STA 600 should simultaneously receive and process too many probe response frames.

An middle part of FIG. 6 shows a method in which the STA 620 unicasts the probe request frame 630.

Referring to the middle part of FIG. 6, in case the STA 620 unicasts the probe request frame 630, the STA 620 may transmit the probe request frame 630 containing particular SSID/BSSID information of the AP. Among the APs that receive the probe request frame 630, only the AP 625 corresponding to the SSID/BSSID specified by the STA 620 may transmit a probe response frame to the STA 620.

An lower part of FIG. 6 shows a method in which the STA 640 multicasts the probe request frame 660.

Referring to the lower part of FIG. 6, the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

As described above, existing STAs transmits the probe request frame based on unicast transmission after the probe delay time and waits to receive ACK and the probe response frame transmitted by the AP. The existing STAs transmitting the probe request frame can monitors the current channel until the MaxChannelTime without scanning another channel when the existing STAs receives PHY-CCA.indication primitive even if the existing STAs cannot receives ACK after SIFS and the MinChannelTime has been expired.

When a STA cannot receive ACK for the transmitted probe request frame transmitted based on unicast transmission, the possibility that there is no target AP to receive the probe request frame near the STA is high. However, if the STA receiving the PHY-CCA.indication primitive can monitors the current channel until the MaxChannelTimewhen the STA receives PHY-CCA.indication primitive even if the existing STAs cannot receives ACK after SIFS and the MinChannelTime has been expired. This makes a large value of scanning delay.

Figure 7:
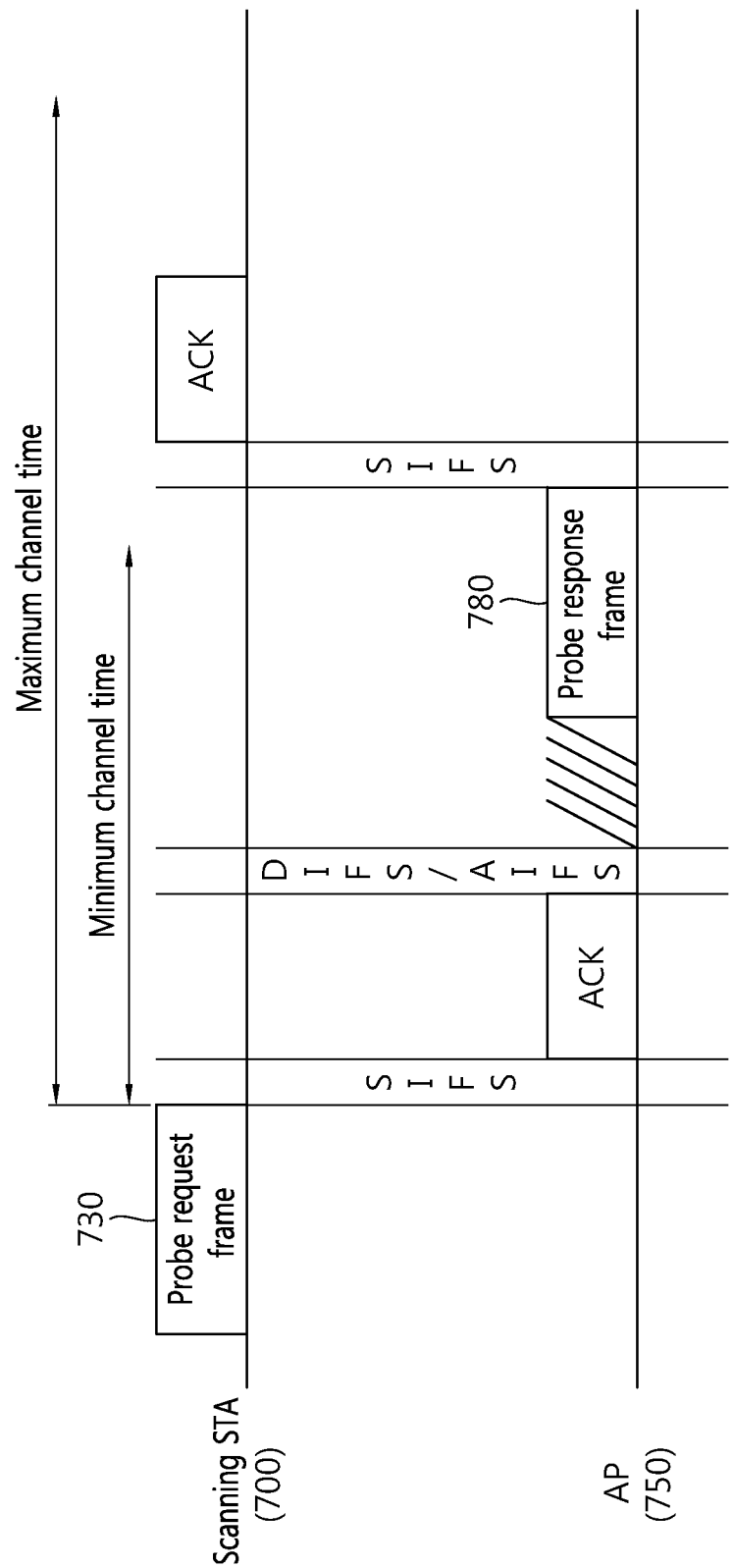
FIG. 7 is a concept diagram illustrating an active scanning method of a scanning STA.

FIG. 7 is a concept diagram illustrating an active scanning method of a scanning STA.

Referring to FIG. 7, an STA 700 starts a method for perform active scanning.

First, the STA 700 may receive a MLME-SCAN request primitive where a scanning time is indicated by active scan to perform a following operation with respect to each scanning target channel.

First, the STA 700 waits until the probe delay time is expired and a PHY-RXSTART. indication primitive is received, and may perform access by a basic access procedure. When the access is possible, the STA 700 may transmit a probe request frame 730 to an AP 750. The AP 750 receiving the probe request frame may be indicated by a MLME-SCAN request primitive. The STA 700 sets a probe timer to 0 and starts a probe timer.

When the PHY-CCA. indication primitive (busy) is not searched until a probe timer becomes a minimum channel time, the STA 700 may set the NAV to 0 to scan a next channel. Conversely, when the PHY-CCA. indication primitive (busy) is searched before the probe timer becomes the minimum channel time, the STA 700 may perform a following procedure.

The STA 700 may process a received probe response frame 780. Further, the STA 700 may process a received beacon, a measurement pilot or a FILS search frame.

In addition, the STA 700 may differently set timing to report a scanning result based on configuration with respect to a reporting method.

For example, when a reporting option is set as an IMMEDIATE, and a new AP 750 or new information on the AP 750 is searched as a result of performing scanning, the STA 700 may generate a MLME-SCAN. confirmation primitive including the searched result.

As another example, when the reporting option is set as a CHANNEL-SPECIFIC, the STA 700 may generate the MLME-SCAN. confirmation primitive based on all results of performing scanning a corresponding channel at a maximum channel time.

Figure 8:
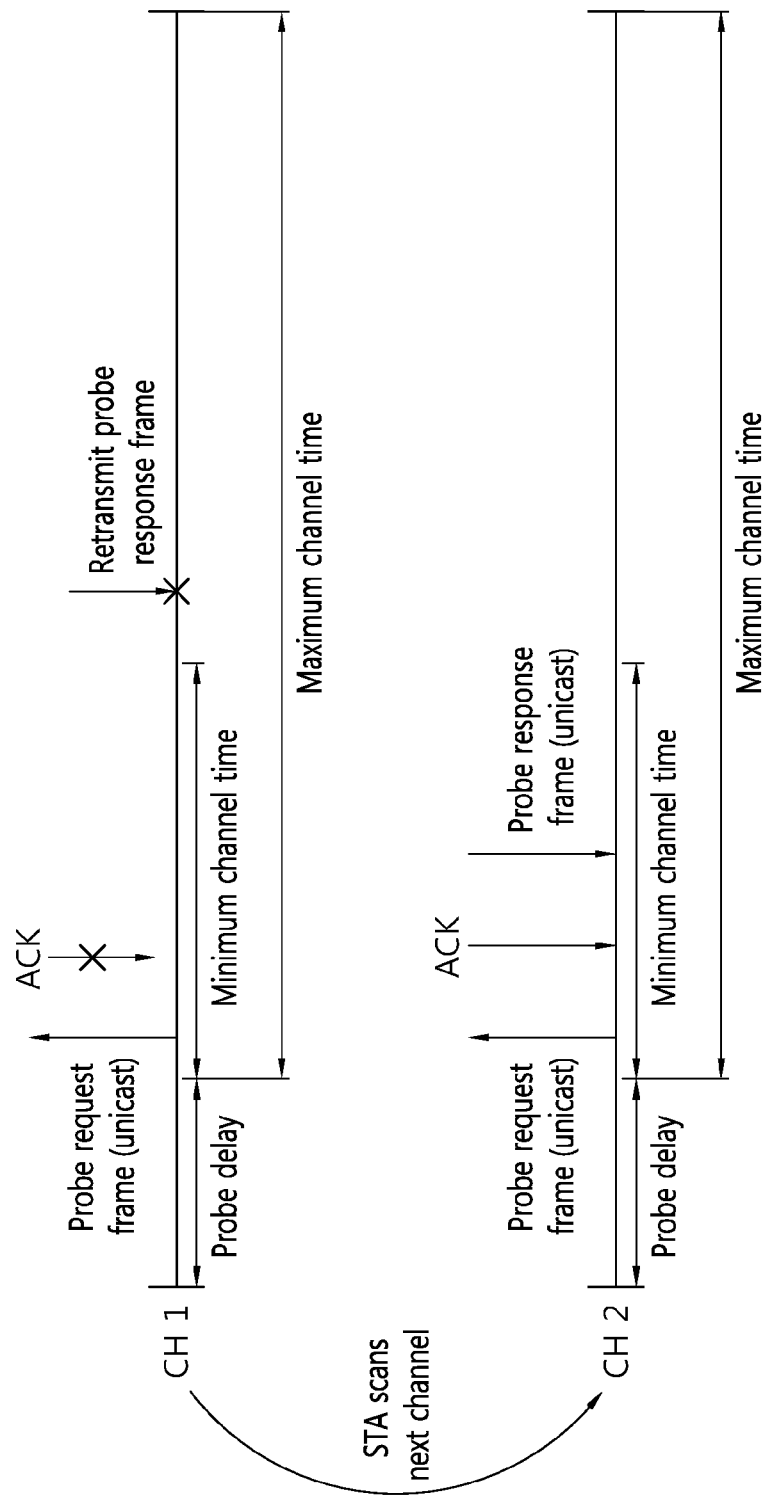
FIG. 8 is a concept diagram illustrating an active scanning method according to an embodiment of the present invention.

FIG. 8 is a concept diagram illustrating an active scanning method according to an embodiment of the present invention.

FIG. 8 discloses an active scanning operation for reducing scanning delay of the STA. According to an embodiment of the present invention, the STA may determine whether to perform the active scanning operation based on presence of reception of an acknowledgement (ACK).

When the STA transmits the probe request frame and searches a PHY-CCA. Indication primitive (busy) in order to reduce the scanning delay, if the ACK is not received after an SIFS, the STA may move to a channel different from a current channel. When scanning all the channels is terminated, the scanning procedure may be terminated. Hereinafter, the embodiment of the present invention is described on the assumption that a scanning channel is moved to another channel from the current channel.

That is, when the STA does not receive the ACK, the STA may determine that a target AP is not located around the STA and may not monitor a current channel until a maximum channel time, and move the scanning channel to another channel to perform scanning the move channel. In practice, if it is assumed that the target AP is not located, the STA may reduce the scanning delay by a difference (maximum channel time−minimum channel time) between the maximum channel time and the minimum channel time.

Figure 9:
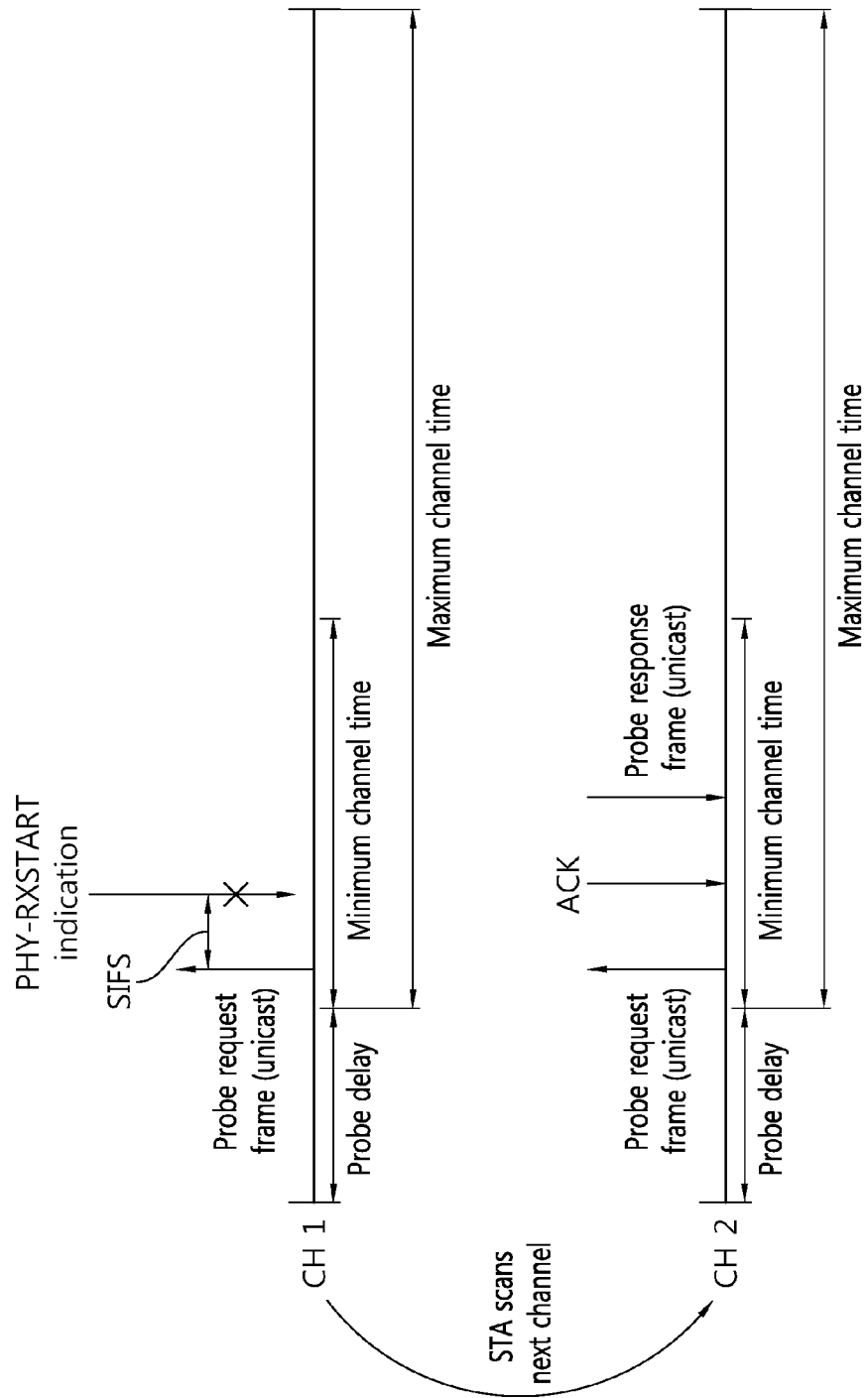
FIG. 9 is a concept diagram illustrating an active scanning method according to an embodiment of the present invention.

FIG. 8 illustrates that the STA monitors presence of transmission of the ACK and determines whether to move the scanning channel. The STA may perform monitoring for a time shorter than the minimum channel time with respect to the presence of transmission of the ACK. FIG. 9 illustrates a method of monitoring whether to transmit the ACK for a short inter frame space (SIFS) after transmission of the probe request frame being a time short than the minimum channel time.

FIG. 9 is a concept diagram illustrating an active scanning method according to an embodiment of the present invention.

FIG. 9 illustrates a method of monitoring whether to transmit an ACK for a time shorter than a minimum channel time by an STA.

Referring to FIG. 9, when the STA does not receive the ACK for an SIFS after transmission of a probe request, the STA may move the scanning channel to a next channel. In this case, in practice, when there is no target AP, the STA may reduce scanning delay by a difference (maximum channel time−SIFS) between the maximum channel time and the SIFS.

Hereinafter, an embodiment of the present invention discloses a method of monitoring a channel when the STA performs active scanning.

An existing STA transmits a probe request frame after probe delay and monitors a probe response frame transmitted from the AP. The AP transmits a probe response frame but the STA may not receive a probe response frame due to collision or other problems. In this case, when the STA searches a PHY-CCA. Indication primitive (busy), the STA does not receive the probe response frame at a corresponding channel and may perform a scanning procedure by changing the scanning channel to other channel after the maximum channel time.

In a side of the AP, the AP does not receive the ACK with respect to a first probe response frame transmitted to the STA from the STA. Accordingly, the AP may retransmit the probe response frame to the STA. If the probe response frame retransmitted from the AP is transmitted after the minimum channel time, since the STA previously moves to another channel, the STA may not receive the probe response frame.

According to the embodiment of the present invention, in order to solve where an AP transmits a probe response frame although the AP moves to another channel, the STA may transmit a probe request frame while adding information on a method of monitoring a channel to the probe request frame. The AP may determine a method of transmitting a probe response frame based on information on a method of monitoring a channel transmitted from the STA.

Figure 10:
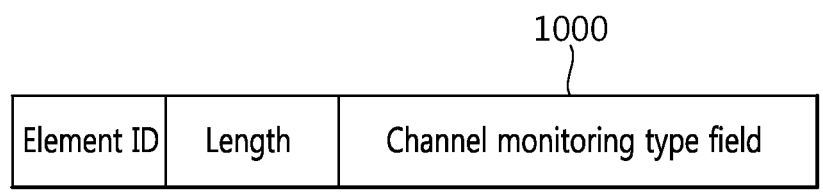
FIG. 10 is a concept diagram illustrating a probe request frame according to an embodiment of the present invention.

FIG. 10 is a concept diagram illustrating a probe request frame according to an embodiment of the present invention.

FIG. 10 discloses a method of transmitting a probe request frame in such a way that the STA adds information on a method of monitoring a channel to the probe request frame.

The probe request frame may include a channel monitoring type field 1000.

Referring to FIG. 10, the channel monitoring type field 1000 may include information on a method of monitoring a channel when the STA transmits the probe response frame.

For example, when the channel monitoring type field 1000 is 0, the STA searches a PHY-CCA. indication primitive (busy) for the minimum channel time but the STA does not receive a PHY-RXSTART. Indication primitive, the STA does not monitor a probe response frame by the maximum channel time and may indicate to move to a next scanning channel after the minimum channel time.

When the channel monitoring type field 1000 is 1, the STA searches a PHY-CCA. Indication primitive for a minimum channel time. PHY-RXSTART but the STA does not receive a PHY-RXSTART. indication primitive, the STA may indicate to monitor a probe response frame by the maximum channel time. The above channel monitoring type is one example of a used field in order to indicate a channel monitoring method of the STA, and may indicate information on a channel monitoring type of the STA using various other fields and field values.

The STA may determine a channel monitoring type based on available scanning delay. The available scanning delay may include information on an available time in order to receive the probe response frame in the scanning channel by the STA. For example, the STA may determine a channel monitoring type according to presence of sensitivity to the scanning delay.

Figure 11:
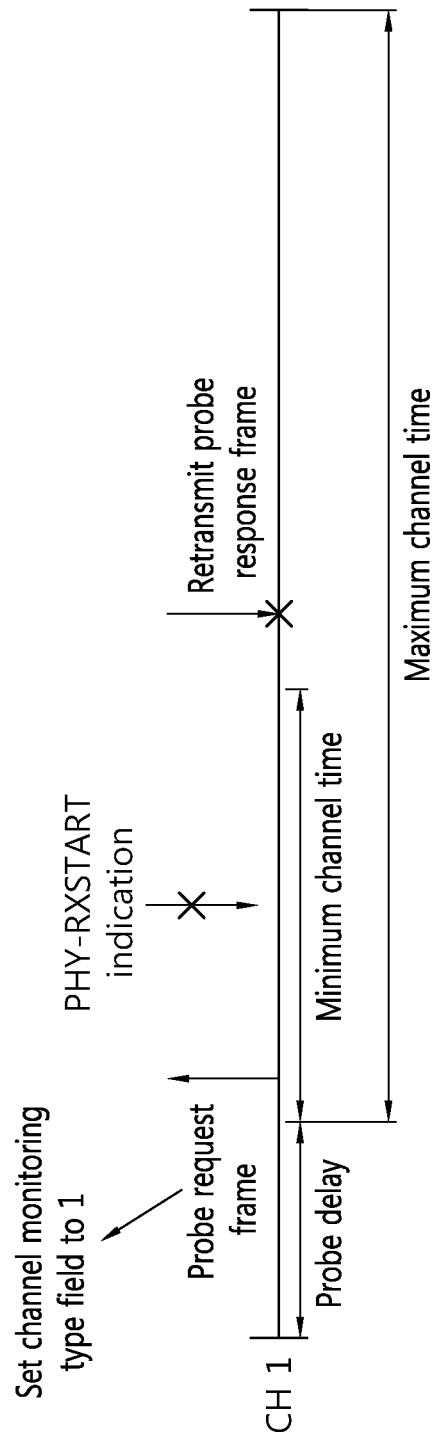
FIG. 11 is a concept diagram illustrating an active scanning method of an STA according to an embodiment of the present invention.

FIG. 11 is a concept diagram illustrating an active scanning method of an STA according to an embodiment of the present invention.

FIG. 11 discloses an active scanning method of the STA when the channel monitoring type field disclosed in FIG. 10 is set to 1.

The STA may determine a value of a channel monitoring type field according to various determinations. For example, when reception of the probe response frame is a factor more important than reduction of the scanning delay, the STA may transmit the probe request frame having a value of the channel monitoring type field set to 1 to the AP.

Referring to FIG. 11, it is assumed that the STA transmits a probe request frame having a value of a channel monitoring type field set to 1. When the channel monitoring type field transmitted from the STA is 1, the STA searches a PHY-CCA. indication primitive for the minimum channel time but the STA does not receive the PHY-RXSTART. indication primitive, the STA may indicate to monitor the probe response frame by the maximum channel time.

It may be assumed that the AP transmits the probe response frame, but the STA does not receive the probe response frame due to a problem such as collision and searches PHY-CCA. indication primitive (busy), and does not receive the PHY-RXSTART. indication primitive.

When the value of the channel monitoring type field is indicated as 1, the STA may monitor a current channel until the maximum channel time. The AP may know that the STA monitors a current channel until the maximum channel time. Since the AP does not receive an ACK with respect to the probe response frame transmitted from the STA, the AP may retransmit the probe response frame to the STA. The AP may determine retransmission of the probe response frame based on the information on the channel monitoring type field.

For example, the AP may determine whether to retransmit the probe request frame based on the information on the channel monitoring type field included in the probe request frame. Only when the value of the channel monitoring type field included in the probe request frame transmitted from the STA is 1, the AP may retransmit the probe response frame. Conversely, the value of the channel monitoring type time included in the probe request frame transmitted from the STA is 0, the AP determines that the STA moves to another channel and may not retransmit the probe response frame.

An operation of determining whether to transmit the probe response frame of the AP is one example and the AP may perform another operation according to the channel monitoring type field. For example, when the channel monitoring type field is 1, retransmission of the probe response frame of the AP may not be limited until the maximum channel time is terminated. Conversely, when the channel monitoring type field is 0, retransmission of the probe response frame may be restrictively performed until the minimum channel time is terminated.

When the channel monitoring type field is 1, the STA may monitor until the maximum channel time to receive a probe response frame previously transmitted from the AP.

Figure 12:
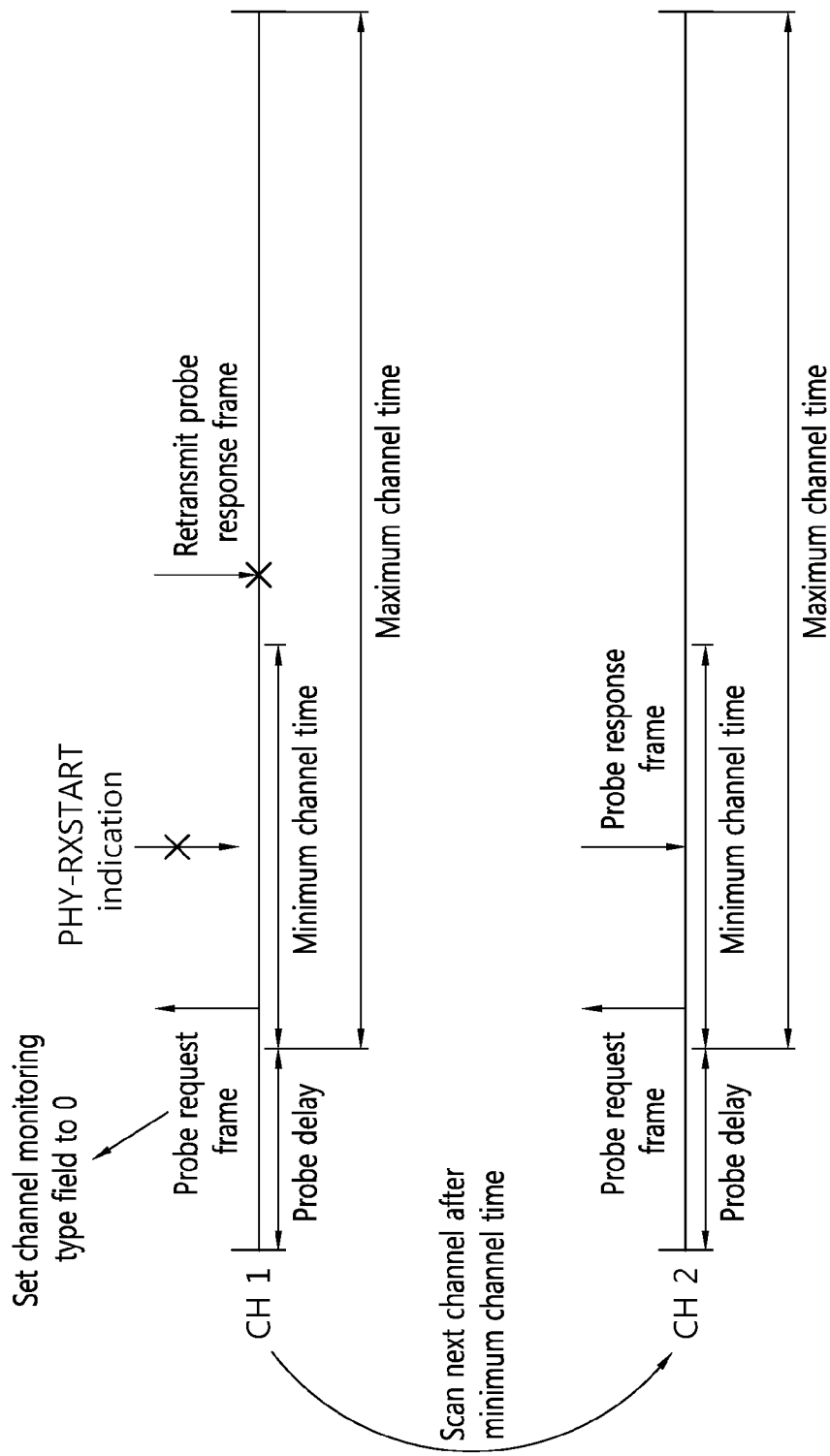
FIG. 12 is a concept diagram illustrating an active scanning method of an STA according to an embodiment of the present invention.

FIG. 12 is a concept diagram illustrating an active scanning method of an STA according to an embodiment of the present invention.

FIG. 12 discloses an active scanning method of the STA when a channel monitoring type field illustrated in FIG. 10 is set to 0. The STA may determine a value of the channel monitoring type field according to various determinations. For example, when the reduction of the scanning delay is a factor more important than the reception of the probe response frame, the STA may transmit the probe request frame having a value of the channel monitoring type field set to 0 to the AP.

Referring to FIG. 12, it is assumed that the STA transmits a probe request frame having a channel monitoring type field set to 0. When the channel monitoring type field transmitted from the STA is 0, the STA searches a PHY-CCA. indication primitive for the minimum channel time but the STA does not receive the PHY-RXSTART. indication primitive, the STA may indicate to monitor the probe response frame by the minimum channel time.

It may be assumed that the AP transmits the probe response frame, but the STA does not receive the probe response frame due to a problem such as collision and searches PHY-CCA. indication primitive (busy), and does not receive the PHY-RXSTART. indication primitive.

When the value of the channel monitoring type field is indicated as 0, the STA may monitor the current channel until the minimum channel time. Since the AP does not receive an ACK with respect to the probe response frame transmitted from the STA, the AP may retransmit the probe response frame to the STA. The AP may determine retransmission of the probe response frame based on the information on the channel monitoring type field.

As described above, for example, when the value of the channel monitoring type field included in the probe request frame transmitted from the STA is 0, the AP determines that the STA moves to another channel and may not perform retransmission of the probe response frame.

As another example, when the channel monitoring type field is 0, the AP may restrictively perform retransmission of the probe response frame for the minimum channel time unit the STA moves to another channel.

According to another embodiment of the present invention, the STA may transmit a method of monitoring a channel to the AP when the STA performs active scanning based on various information formats.

For example, a FILS indication element and an active scanning delay sensitive type element may be included in the probe request frame. When the STA searches a PHY-CCA. indication primitive (busy) based on the FILS indication element and the active scanning delay sensitive type element but does not receive the PHY-RXSTART. indication primitive, the STA may indicate to move to a next scanning channel after a minimum channel time. Further, in the same manner, when the STA searches a PHY-CCA. indication primitive (busy) based on the FILS indication element and the active scanning delay sensitive type element but does not receive the PHY-RXSTART. indication primitive, the STA may monitor a probe response frame until a maximum channel time.

Following table 2 and table 3 list the FILS indication element and the active scanning delay sensitive type element.

TABLE 2

| Element ID | Length | FILS indicator |
|---|---|---|
|  |  | 0: Non FILS STA<br>1: FILS STA<br>2~7: reserved |

Referring to the table 2, the FILS indication element may indicate information on whether or not the STA is a fast initial link setup (FILS) STA. The STA is divided whether or the STA is a FILS STA. Only when the STA is the FILS STA, the STA may additionally determine a method of monitoring a channel upon performing the active scanning. For example, when the element ID is 0, the STA is the non-FILS STA. When the element ID is 1, the STA is a FILS STA.

TABLE 3

| Element ID | Length | Active scanning delay sensitive type indication: |
|---|---|---|
|  |  | 0: Non active scanning delay sensitive STA<br>1: Active scanning delay sensitive STA<br>2~7: Reserved |

Referring to the table 3, the active scanning delay sensitive type element may be used to transfer information on a method of performing active scanning by the FILS STA.

When the STA is the FILS STA, the scanning time may be differently set. For example, it may be assumed that the FILS indication element is set to 1 and the active scanning delay sensitive type element is set to 1. In this case, when the STA searches PHY-CCA. Indication primitive (busy) for the minimum channel time, but does not receive the PHY-RXSTART. indication primitive, the STA may move to a next channel after the minimum channel time to perform scanning.

Further, when the FILS indication element is set to 1 and the active scanning delay sensitive type element is set to 0 the STA searches the PHY-CCA. indication primitive (busy) for the minimum channel time. However, when the STA does not receive the PHY-RXSTART. indication primitive, the STA may extend a probe timer of the STA to monitor a probe response frame until the maximum channel time.

Figure 13:
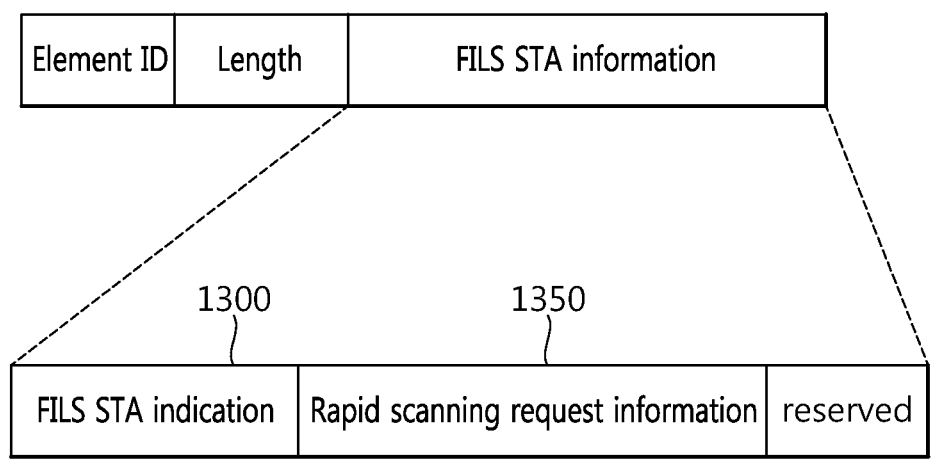
FIG. 13 is a concept diagram illustrating an information format to transmit information on active scanning of the STA according to an embodiment of the present invention.
Figure 14:
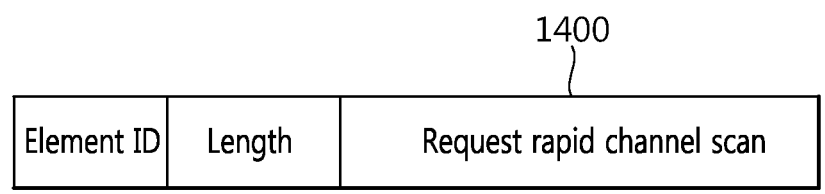
FIG. 14 is a concept diagram illustrating an information format to transmit information on active scanning of the STA according to an embodiment of the present invention.

The information on the channel monitoring type of the STA may be transmitted based on various information formats. FIG. 13 and FIG. 14 illustrate examples of other information format to transmit information on the channel monitoring type of the STA.

FIG. 13 is a concept diagram illustrating an information format to transmit information on active scanning of the STA according to an embodiment of the present invention.

FIG. 13 illustrates an information formation for transmitting information on an operation upon active scanning. The above information may be transmitted while being included in the probe request frame of the STA as described above.

An FILS STA information element defined as a specific element ID in the probe request frame may be transmitted.

The FILS STA information element may include the FILS STA indication 1300 and rapid scanning request information 1350.

The FILS STA indication 1300 may include information for indicating whether or not a current STA is the FILS STA. For example, when the FILS STA indication 1300 is 1, it may be indicated that the STA is the FILS STA.

The rapid scanning request information 1350 may be further included when the STA is the FILS STAT based on the FILS STA indication 1300.

The rapid scanning request information 1350 may include information on whether to move the scanning channel to another channel when the STA does not receive the PHY-RXSTRAT. indication primitive before the probe time become the minimum channel time. In the above situation, for example, when the rapid scanning request information 1350 is 1, the STA may move the scanning channel to another channel after the minimum channel time. That is, the STA may set an NAV to the 0 to scan a next channel. Conversely, for example, in the above situation, when the rapid scanning request information 1350 is 0 the STA may monitor a frame from a corresponding channel until the maximum channel time.

FIG. 14 is a concept diagram illustrating an information format to transmit information on active scanning of the STA according to an embodiment of the present invention.

FIG. 14 illustrates an information format for transmitting information on an operation upon active scanning. As described above, the above information may be transmitted while being included in the probe request frame of the STA. Unlike FIG. 13, the above information may not include information on whether the STA is the FILS STA.

Rapid scanning request information 1400 may be included in the probe request frame. The rapid scanning request information 1400 may include information on whether to move the scanning channel to another channel when the FILS STA does not receive a PHY-RXSTART. indication primitive before the probe time becomes the minimum channel time.

In the above situation, for example, when the rapid scanning request information 1400 is 1, the FILS STA may move the scanning channel to another channel after the minimum channel time. That is, the FILS STA may set the NAV to 0 to scan a next channel. In contrast, in the above situation, for example, when the rapid scanning request information 1400 is 0 the FILS STA may monitor the frame from a corresponding channel until the maximum channel time.

Figure 15:
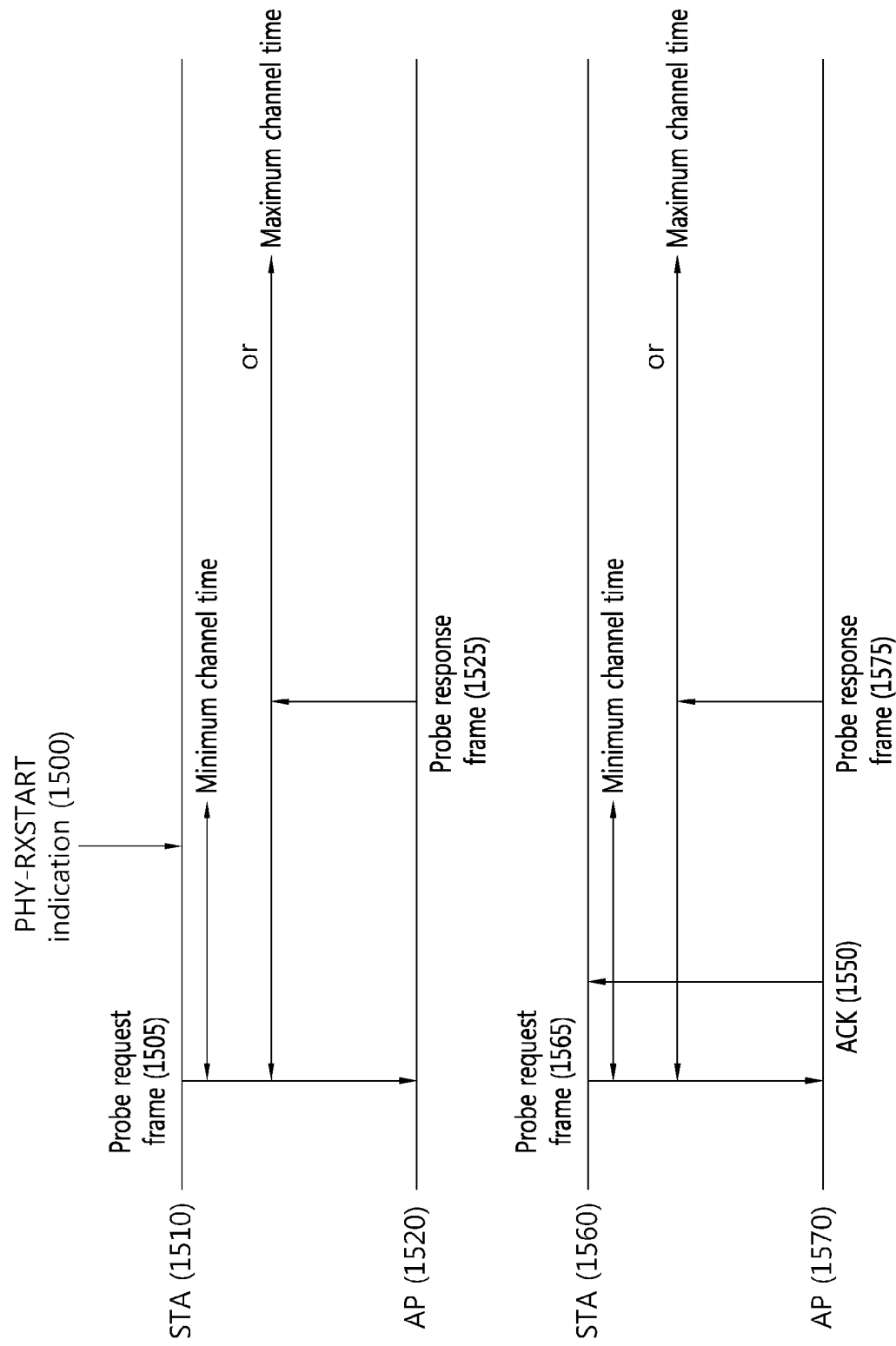
FIG. 15 is a concept diagram illustrating an active scanning method of a scanning STA according to an embodiment of the present invention.

FIG. 15 is a concept diagram illustrating an active scanning method of a scanning STA according to an embodiment of the present invention.

FIG. 15 discloses a method of performing active scanning by the STA.

First, the STA may receive a MLME-SCAN. request primitive where the scanning type is indicated by active scan to perform a following operation with respect to each scanning target channel.

First, when the primitive delay time is terminated or after the STA waits until the PHY-RXSTART. indication primitive is received, the STA may perform access according to a basic access procedure. When the access is possible, the STA may transmit the probe request frame to the AP. An AP to which the STA transmits the probe request frame may be indicated by an MLME-SCAN. request primitive. The STA sets a timer to 0 and starts the probe timer.

When the PHY-CCA.indication primitive (busy) is not searched before the probe timer becomes the minimum channel time, the STA may set the NAV to 0 to scan a next channel. In contrast, when the PHY-CCA.indication primitive (busy) is searched before the probe timer becomes the minimum channel time.

According to an embodiment of the present invention, the STA 1510 searches a PHY-CCA. indication primitive after transmission of the probe request frame 1505, and may differently perform a channel scanning procedure according to whether to receive the PHY-RXSTART. indication primitive 1500. As described, the STA 1510 may perform a following operation according to the channel monitoring type field configured by the STA 1510. For example, when the PHY-RXSTART. indication primitive 1500 is received, the STA 1510 may monitor the channel until the maximum channel time to receive the probe response frame 1525. When the PHY-RXSTART. indication primitive 1500 is not received, the STA 1510 may move the scanning channel to another channel after the minimum channel time.

According to another embodiment of the present invention, the STA 1560 may determine a method of scanning the channel according to whether to receive an ACK 1550 with respect to the probe request frame 1565. For example, when the STA 1560 receives the ACK 1550 with respect to the probe request frame 1565 transmitted from the STA 1560, the STA 1560 may monitor the channel until the maximum channel time. Conversely, when the STA 1560 does not receive the ACK 1550 with respect to the probe request frame 1565 transmitted from the STA 1560, the STA 1560 may monitor the channel until the minimum channel time to move the scanning channel to another channel after the minimum channel time.

Figure 16:
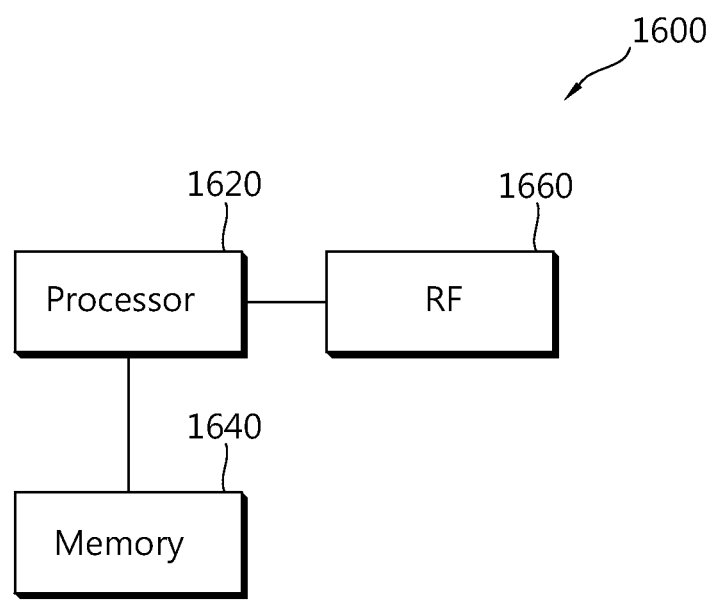
FIG. 16 is a block diagram illustrating a wireless device according to an embodiment of the present invention.

FIG. 16 is a block diagram illustrating a wireless device according to an embodiment of the present invention.

Referring to FIG. 16, a wireless device 1600 is an STA capable of implementing the above embodiment and may be an AP or a non-AP STA.

The wireless device 1600 includes a processor 1620, a memory 1640, and a radio frequency (RF) unit 1660.

The RF unit 1660 is connected to the processor 1620, and sends and receives radio signals.

The processor 1620 performs the proposed functions, processes and/or methods. For example, the processor 1620 may be configured to implement an operation the wireless device 1600 according to the embodiment of the present invention.

For example, the processor 1620 may transmit a probe request frame including channel monitoring type information in a scanning channel to the AP, may determine whether the scanning channel is in a busy state until the minimum channel time, and may determine whether to receive a PPDU including a valid PLCP header at the scanning channel by the minimum channel time.

Further, the processor 1620 may be configured to determine a time of monitoring the probe response frame transmitted from the AP at a scanning channel based on whether the PPDU is received by the minimum channel time and channel monitoring type information. The processor 1620 may include Application-Specific Integrated Circuits (ASICs), other chipsets, logic circuits, data processors, and/or a converter for converting a baseband signal and a wireless signal. The memory 1640 may include Read-Only Memory (ROM), Random Access Memory (RAM), flash memory, memory cards, storage media and/or other storage devices. The RF unit 1660 may include at least one antenna configured to send and receive radio signals.

The processor 1620 may include an ASIC (Application-Specific Integrated Circuit), other chipset, a logic circuit, a data processing device, and/or a converter that performs conversion between a baseband signal and a radio signal. The memory 1640 may include a ROM (Read-Only Memory), a RAM (Random Access Memory), a flash memory, a memory card, a storage medium, and/or other storage device. The RF unit 1660 may include one or more antennas that transmit and/or receive radio signals.

When an embodiment is implemented in software, the above-described schemes may be embodied in modules (processes, or functions, etc.) performing the above-described functions. The modules may be stored in the memory 1640 and may be executed by the processor 1620. The memory 1640 may be positioned in or outside the processor 1620 and may be connected with the processor 1620 via various well-known means.

What is claimed is:

1. A method for active scanning of a station (STA), the method comprising:

transmitting, by the STA, to an access point (AP), a probe request frame including channel monitoring type information in a scanning channel;

determining, by the STA, whether the scanning channel is in a busy state until a MinimumChannelTime;

determining, by the STA, whether a physical layer convergence procedure protocol data unit (PPDU) including a valid physical layer convergence procedure (PLCP) header is received in the scanning channel until the MinimumChannelTime; and determining a time for monitoring a probe response frame transmitted by the AP in the scanning channel based on whether the PPDU is received until the MinimumChannelTime and the channel monitoring type information, when the scanning channel is in the busy state, wherein the channel monitoring type information includes information related to a type of the STA to monitor the probe response frame in the scanning channel, wherein the time for monitoring the probe response frame is determined as the MinimumChannelTime when the PPDU is not received in the scanning channel until the MinimumChannelTime and the channel monitoring type information indicates a first type, and wherein the time for monitoring the probe response frame is determined as a MaxChannelTime when the PPDU is not received in the scanning channel until the MinimumChannelTime and the channel monitoring type information indicates a second type.

2. The method of claim 1, further comprising monitoring, by the STA, the scanning channel during the maximum channel time when the STA receives the PPDU in the scanning channel until the MinimumChannelTime.

3. The method of claim 1, wherein the probe request frame further includes information related to whether the STA is an STA for performing rapid link configuration, and wherein the time for monitoring the probe response frame is determined when the STA is a STA for performing rapid link configuration.

4. The method of claim 1, wherein the AP determines whether to retransmit the probe response frame based on the channel monitoring type information.

5. The method of claim 1, further comprising determining the channel monitoring type information based on available scanning delay by the STA, wherein the available scanning delay is an available time in order to receive the probe response frame in the scanning channel by the STA.

6. The method of claim 5, wherein the first type is configured according to the type of the STA when a priority for reception of the probe response frame is lower than a priority for reduction of the available scanning delay, wherein the second type is configured according to the type of the STA when a priority for reception of the probe response frame is higher than a priority for reduction of the available scanning delay.

7. A station (STA) for performing active scanning, the STA comprising:

a radio frequency (RF) unit configured to transmits and receive radio signals; and a processor operatively coupled to the RF unit and configured to:

transmit to an access point (AP), a probe request frame including channel monitoring type information in a scanning channel;

determine whether the scanning channel is in a busy state until MinimumChannelTime, determine whether a PPDU including a valid physical layer convergence procedure (PLCP) header is received in the scanning channel until the MinimumChannelTime, and determine a time for monitoring a probe response frame transmitted by the AP in the scanning channel based on whether the PPDU is received until the MinimumChannelTime and the channel monitoring type information, when the scanning channel is in the busy state, wherein the channel monitoring type information includes information related to a type of the STA to monitor the probe response frame in the scanning channel, wherein the time for monitoring the probe response frame is determined as the MinimumChannelTime when the PPDU is not received in the scanning channel until the MinimumChannelTime and the channel monitoring type information indicates a first type, and wherein the time for monitoring the probe response frame is determined as a MaxChannelTime when the PPDU is not received in the scanning channel until the MinimumChannelTime and the channel monitoring type information indicates a second type.

8. The STA of claim 7, wherein the processor is configured to monitor the scanning channel during the maximum channel time when the PPDU is received in the scanning channel until the MinimumChannelTime.

9. The STA of claim 7, wherein the probe request frame further includes information related to whether the STA is an STA for performing rapid link configuration, and wherein the time for monitoring the probe response frame is determined when the STA is an STA for performing rapid link configuration.

10. The STA of claim 7, wherein the AP determines whether to retransmit the probe response frame based on the channel monitoring type information.

11. The STA of claim 7, wherein the processor configured to determine the channel monitoring type information based on available scanning delay, and wherein the available scanning delay is an available time in order to receive the probe response frame in the scanning channel by the STA.

12. The STA of claim 11, wherein the first type is configured according to the type of the STA when a priority for reception of the probe response frame is lower than a priority for reduction of the available scanning delay, wherein the second type is configured according to the type of the STA when a priority for reception of the probe response frame is higher than a priority for reduction of the available scanning delay.

* * * * *